Feb. 14, 1967  O. N. HINSVARK  3,304,159
GAS CHROMATOGRAPHIC ANALYSIS METHOD FOR C, H, AND N
CONTENT IN SOLID ORGANIC COMPOUNDS
Filed Jan. 28, 1963  4 Sheets-Sheet 2

INVENTOR
ORVILLE N. HINSVARK

BY *McCarthy, Depaoli & O'Brien*
ATTORNEYS

INVENTOR
ORVILLE N. HINSVARK

United States Patent Office 3,304,159
Patented Feb. 14, 1967

3,304,159
GAS CHROMATOGRAPHIC ANALYSIS METHOD FOR C, H, AND N CONTENT IN SOLID ORGANIC COMPOUNDS
Orville N. Hinsvark, Wilmington, Del., assignor, by mesne assignments, to Hewlett-Packard Company, Palo Alto, Calif., a corporation of California
Filed Jan. 28, 1963, Ser. No. 254,220
4 Claims. (Cl. 23—230)

The present invention relates, in general, to methods and apparatus for chemical analysis, especially analysis of combustion products which are obtained from samples including the elements carbon, hydrogen and nitrogen. In particular it relates to method and apparatus for the micro-determination of the elements contained in organic materials by chromatographic study of the products of combustion of such materials. While the apparatus and method of the invention may be used for study of mixed materials and of inorganic compounds in some cases, they are especially intended for pure or single organic compounds.

In the art of qualitative and quantitative identification of compounds there exist many relatively elaborate and sophisticated methods of determining the composition of substances and solutions. These methods include, among others, the measurement of volume or mass by chemical or physical techniques. Needless to say, many of these methods suffer the disadvantage that they are costly and time consuming. Another serious disadvantage lies in the fact that these methods often require the use of highly skilled technicians for obtaining reliable data.

Accordingly, it is a primary object of this invention to provide an improved, simplified and accelerated method of determining the quantity and quality of the ingredients of a sample of a compound by subjecting the sample to a chemical reaction to convert it to gaseous products and measuring the gaseous products so produced by gas chromatography.

Another object of the present invention is to measure qualitatively and quantitatively the constituents of a compound by complete combustion thereof. This combustion is accomplished by oxidative pyrolitic means and is followed by chromatographic analysis or measurement of the products of combustion. By suitable modification of procedures, the invention also may be used for analysis by reduction of the sample, rather than oxidation.

A further important object of the invention is the provision of simplified and improved apparatus for carrying out such a method.

An additional object of the invention resides in the feature of a method of and apparatus for the simultaneous specific determination of the nitrogen, hydrogen and carbon content of a sample of chemical material, in contrast to hitherto known analytical processes wherein either the nitrogen or the carbon-hydrogen content have been determined by separate measurement.

Still another object of the invention resides in the provision of apparatus for the carrying out of the above process which is so simple in construction and operation as to permit a relatively unskilled operator to obtain the requisite measurements in an extremely reliable manner in a minimum of time, approximately one-half to one-third the time required by the use of previously known techniques, and in a single operation.

Still another object of the invention resides in the provision of a system wherein the sample is subjected to complete combustion, preferably in the presence of a catalyzed oxidant, and the combustion products are thereafter separated, detected and recorded by means of a dual-column dual-detector system.

The method of the instant invention, in general, comprises the sequence of steps of subjecting a sample to be analyzed to complete combustion (or reduction in appropriate cases), under selected reaction conditions, in a combustion (or reduction) zone. In the case of combustion, which is normally preferred, oxidation takes place preferably in the presence of catalyzed cupric oxide as the oxidant. The method includes passing carrier gas through said combustion zone, preferably after combustion is complete, to sweep the combustion products therefrom directly into a chromatographic separation zone when the products are separated. Upon emergence from the separation zone, the carrier gas moves the products to the detection zone.

The apparatus of the invention comprises, in series, a combustion zone (or a reduction zone) and at least one chromatographic separation column. It preferably employs dual columns and detectors. The apparatus is provided with means for introducing without contamination a sample to be analyzed, means for storing the products of combustion until combustion is complete, means for introducing carrier gas into the combustion zone after combustion is complete, and means for introducing carrier gas and combustion products into the chromatographic separation column or columns. The chromatographic system is provided with temperature control means and means for detecting all the various emerging combustion products which are to be determined.

More specifically, the method of the instant invention comprises the steps of subjecting a sample of the material to be analyzed, admixed with an oxidant and, preferably, with a catalyst, to a combustion temperature in a furnace or retort. Means are included for storing the products of combustion in a closed loop or expansion system until the combustion is completed. Carrier gas, such as helium, is then introduced as an eluent and the products are conveyed with the carrier gas out of storage to a dual-column, dual-detection system of a conventional type that is capable of successively separating water vapor from the remaining combustion products and then separating the remaining combustion products. A recording, normally of carbon dioxide, nitrogen and water, is produced on a chromatogram, from which, respectively, the carbon, nitrogen and hydrogen content of the sample may be determined. The use of the dual-column, dual-detector system permits isothermal operation. This is in contrast to previous processes wherein different temperature conditions or additional product conversions (e.g., of water to acetylene, or of $CO_2$ to $H_2O$) have been required. Additionally, the use of a dual-column, dual-detector system permits the direct and more rapid analysis of combustion products.

An essential feature of the method and apparatus of the invention is that the employment of the features of sample injection, catalytic combustion and dual-column, dual-detection systems permits the direct and rapid measurement of combustion products, eliminating the need of a freezeout trap.

In the method for the simultaneous determination of the carbon, hydrogen and nitrogen composition of a sample, the use of helium is preferred inasmuch as it permits improved accuracy of measurement.

Other objects will, in part, be obvious and, in part, be pointed out as the description of the invention proceeds. A preferred system is disclosed in the accompanying drawings, wherein.

While the instant inventive concept relates broadly to quantitative and qualitative analysis of any composition, including solids and liquids, which is subject to thermal decomposition and gas chromatographic analysis, it has specific application to the rapid determination of the quantity and quality of specific combustion products. It is thus particularly suitable for determining the significant elements, such as carbon, hydrogen and nitrogen, in an organic substance. As an illustrative example, it is applicable particularly to such a material mixed with a catalyzed oxidant such as cupric oxide, using palladium as a catalyst therefor. This oxidant and catalyst combination is particularly suitable for many organic analyses.

Figure 1:
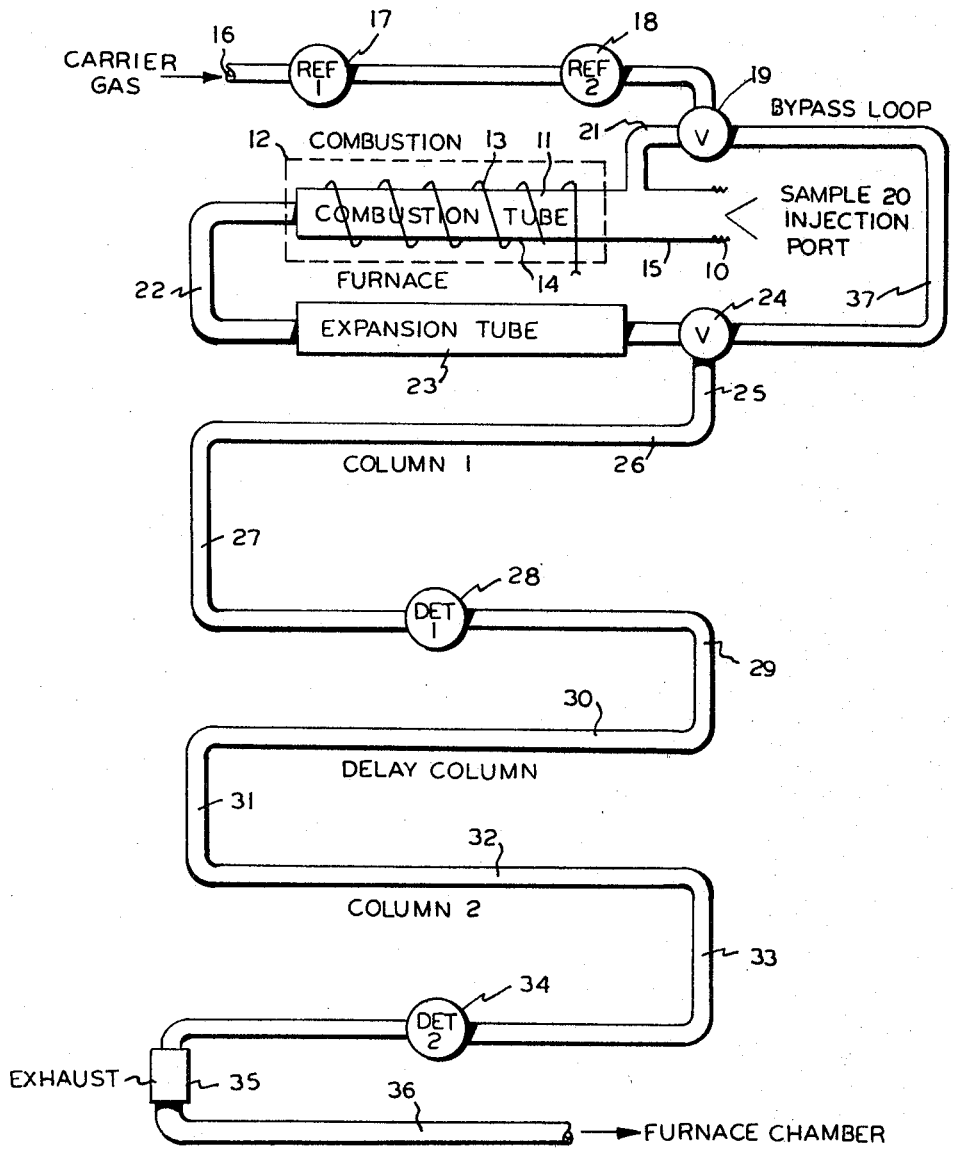
FIGURE 1 is a schematic flow diagram illustrative of the sequential steps of the method and showing schematically the preferred arrangement of the various elements of the apparatus.

Having reference to FIGURE 1, a sample 20 of the material to be analyzed, along with a catalyzed oxidant, preferably such as palladium catalyzed cupric oxide or any solid metal oxide as an oxidizing agent, is inserted through a sample port 10, to be more fully described hereinafter. The sample is then moved into a combustion tube 11 contained within a combustion furnace 12, tube 11 being heated by a conventional coil 13. Tube 11 includes a hot, or thermal decomposition zone or portion 14 in furnace 12, and a cold zone or portion 15 exteriorly of the furnace 12, i.e., to the right as seen in FIGURE 1. The sample is initially inserted in the cold portion 15 of the tube 11. A carrier gas, in this instance an inert gas such as helium, is introduced into the system through an inlet 16 from any suitable source and at any desired pressure. The carrier gas passes through the reference side of a dual-detector, dual-column chromatograph, the dual reference detectors being indicated at 17 and 18.

Any desired conventional type dual-column, dual-detector analytical chromatograph may be employed, although that manufactured by the F & M Scientific Corporation of Avondale, Pennsylvania, designated as Model 720, is entirely and particularly suitable for the purpose. The use of a dual-column, dual-detector system permits isothermal operation in the separation of the combustion products, i.e., water and carbon dioxide.

A pair of by-pass valves 19 and 24 are adapted to be simultaneously turned either to direct the carrier gas to by-pass or to direct it over the cold sample and the oxidant as desired. For a purging operation the latter setting is first used and the carrier gas passes through a line 21 to purge both the combustion tube 11 and the sample, the gas (e.g., helium) thence passing through an exit line 22, through an expansion tube 23 and the second by-pass valve 24 to a passage 25 thence to a first separating column 26 and connecting line 27 to a first sensing detector 28. If, for example, water is one of the combustion products it is desirable to utilize, as is known, the first column to separate the water vapor from the remaining combustion products. The detector may be of any desired type. From detector 28 the carrier gas passes through a drier 29 the carrier gas passes through a drier 29 to remove the water vapor to a delay column 30. This delay column provides improved separation as will be described hereinafter. The gas then passes through a further connection or line 31 to a second separating column 32 and on through a connecting line 33 to a second sensing detector 34. The second column 32 separates the remaining combustion products. Finally, it passes through an exhaust line 35. It may then be returned back to the furnace chamber 12 through a return line 36. The latter is shown only fragmentarily.

After the system has been thoroughly purged, by-pass valves 19 and 24 are turned to open a by-pass line 37. Sample 20 is introduced, in a manner to be described below, into the hot zone 14 of tube 11 which is at a temperature sufficient to effect complete thermal decomposition of the sample 20. This temperature may be as high as approximately 1,000° C. or more. It is held there until the reaction is completed. During this period the gases of combustion are stored in the line 22 and the expansion tube 23.

After the reaction is completed, valves 19 and 24 are turned to readmit carrier gas to tube 11, and pass the gas, together with the combustion products, through the dual separating columns 26 and 32 and their associated detectors 28 and 34, as previously described. The results are recorded on a chromatogram in a known manner. The first detector 28 records the components as they elute through the column 26. The second detector 34 detects and records the remaining components separated by column 32. Recordings are made on conventional chromatograms, which by interpretation and reference discloses, through the quantity and quality of carbon dioxide, water and nitrogen contained in the combustion products, the desired information concerning the elements contained in the sample.

Figure 2:
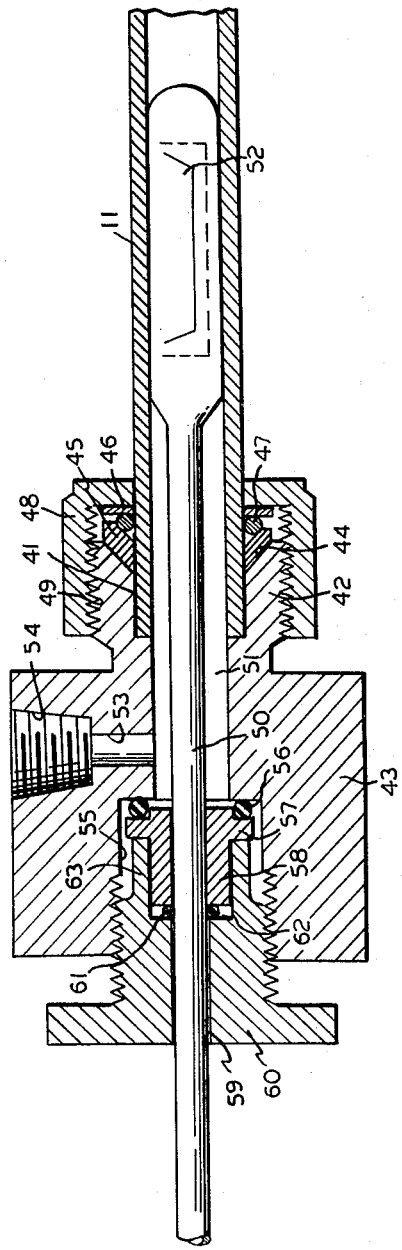
FIGURE 2 is a longitudinal sectional view of a preferred form of apparatus employed in the injection of a sample to be analyzed.

Any desired means may be employed for injecting the sample to be analyzed into the furnace, although a sample injector of the type disclosed in FIGURE 2 has been found to be particularly convenient and desirable. The injector 10 is comprised of a tube 40, one end of which extends into the combustion tube 11, the other end extending into a recess 41 in a boss or flange 42 comprising an integral part of a closure plug 43 closing the end of combustion tube 11. Flange 42 is internally bevelled as at 44 to provide a frusto-conical recess in which seats a frusto-conical sealing gasket 45. A clamping ring 46 engages an O-ring 47 and holds the same against gasket 45. An internally threaded lock nut 48 engaging external threads 49 on boss 42 holds the parts in properly related packing assembly.

A sample handling device comprises an elongated rod 50 which extends through a bore 51 in plug 43 into tube 40. This rod carries at its right end, as seen in FIGURE 2, a sample boat 52. A suitably threaded inlet tube or pipe may be engaged in the threaded recess 54 for attaching the line 21 to the combustion chamber.

The outer end of bore 51, i.e., the left end as seen in FIGURE 2, is provided with an internally threaded enlarged opening 55. An externally threaded locking or packing plug 60 engages the internal threads of the enlarged opening 55 and is adapted to tightly seal the bore 51. To achieve the seal and yet permit operation of the rod 50, the plug 60 is provided with a bore 59 through which the rod 50 extends. A portion 62 at one end of the bore 59 is enlarged to accept a sleeve 58 bearing a flange 57. Suitable packing, illustrated as an O-ring 56, is held in sealing relation by the flange 57 and the seat of the enlarged opening 55. An additional O-ring 61 seats between the shoulder formed by the internal enlargement 62 of bore 59 and the ends of sleeve 58. When under slight compression, ring 61 thus forms a seal around rod 50, preventing axial leakage of gas or vapor along the rod. Enlargement 62 is formed internally of a reduced end portion 63 of the locking plug 60, the end of which abuts the outer side of peripheral flange 57. This applies compression to O-ring 56. A tightly sealed opening is thus provided, by moderate tightening of plug 60, for the end of combustion tube 11. Thus to introduce a sample, the plug 60 is simply removed and the rod 50 with the boat 52 withdrawn. Next the sample and catalyst are placed in the boat 52, the rod 50 is reinserted in the combustion tube 11 and the plug 60 again tightened. From the exterior of tube 11 the rod 50 may be manually, or, if desired, automatically, moved axially to manipulate boat 52 internally of tube 11. An adequate and effective means of introducing solid material for thermal decomposition is thus provided for the accomplishment of the analytical method of the instant invention.

Figure 3:
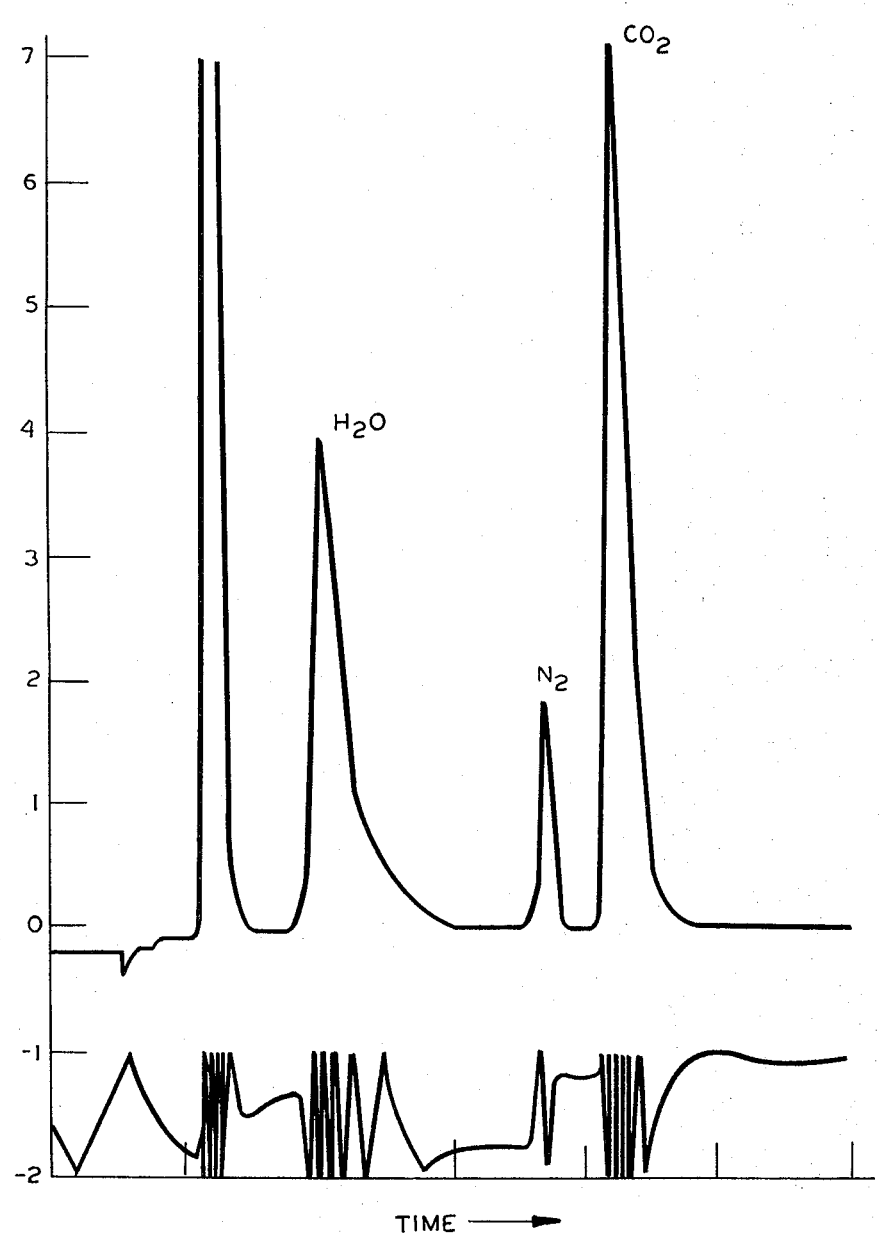
FIGURE 3 is a typical chromatogram, showing combustion products obtained by the thermal decomposition of the disodium salt of ethylene diamine tetra acetic acid at 750° C.

FIGURE 3 discloses a typical chromatogram of combustion products resulting from the thermal decomposition of 2.270 milligrams of the disodium salt of ethylene diamine tetra acetic acid at 750° C.

The first elution peak indicates the combined combustion components other than water vapor. The second elution peak indicates the water vapor content of the combustion products, from which the hydrogen content of the sample may be readily determined. The third peak, representing the output of detector 34, indicates the nitrogen content. The fourth peak, also produced by the second detector 34, indicates the carbon dioxide content from which the carbon content of the sample is readily derived.

Figure 4:
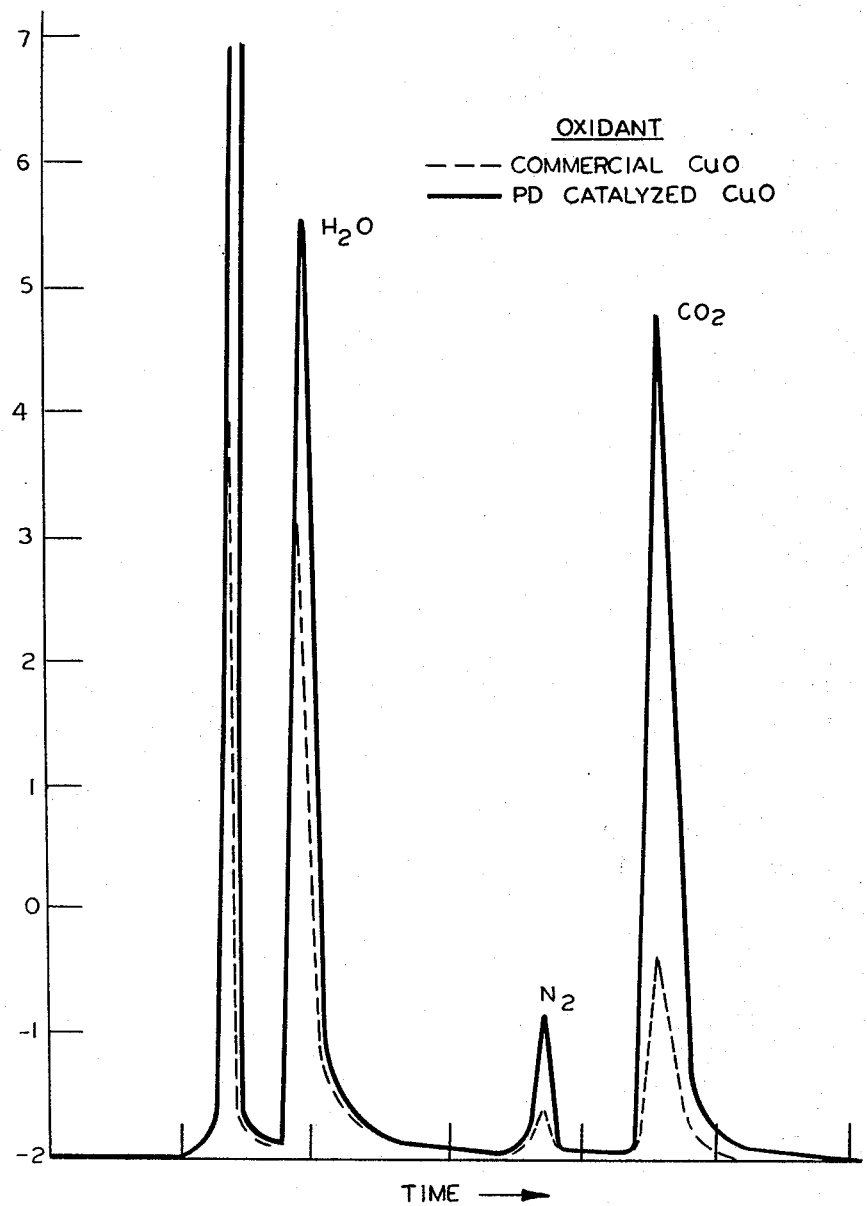
FIGURE 4 is a representation of chromatograms obtained from the thermal decomposition of the disodium salt of ethylene diamine tetra acetic acid with both commercial cupric oxide and palladium catalyzed cupric oxide as oxidant and catalyst, respectively.

Other oxidizing agents than palladium treated cupric oxide may be employed, such as untreated cupric oxide or cobalt oxide. However, cupric oxide treated with palladium has been found most satisfactory. FIGURE 4 illustrates a composite chromatogram showing the elution peaks of the preferred oxidant in comparison with those of commercially supplied cupric oxide, the solid line indicating the results achieved by the analysis of the thermal decomposition products of the disodium salt of ethylene diamine tetra acetic acid with palladium catalyzed cupric oxide, and the dashed line indicating untreated cupric oxide.

The employment of the bypass above described permits the ready and simple injection of samples into the combustion tube, maintained at the decomposition temperatures, eliminates the necessity for a freeze-out trap, and permits the complete combustion of the sample and its reactant prior to measurement of the combustion products.

From the foregoing it will now be seen that there is herein provided an improved method of and apparatus for the qualitative and quantitative elemental analysis of a sample material by thermal decomposition and by subsequent gas chromatographic measurements or analysis. This procedure simplifies and accelerates such measurements. They can be carried out quickly, accurately and expeditiously by a relatively unskilled operator. The method and apparatus thus described accomplish all the objects of this invention and others, including many obvious advantages of great practical utility and commercial importance.

In carrying out the method of the invention a sample to be analyzed is charged to the combustion zone and thermally decomposed as hereinbefore described. The products of combustion are accumulated continuously into a closed system until combustion is complete. Thereupon a carrier gas is admitted and the combustion products are swept out of said zone and delivered to the chromatographic separation zone.

The carrier gas which can be employed in the method and apparatus of the invention can be any of those normally employed in gas chromatography such as helium and the like. Helium is usually preferred for improved sensitivity in that embodiment of the invention wherein the carbon, nitrogen and hydrogen contents of a sample are to be determined simultaneously.

The chromatographic column component of the apparatus of the invention can be of any desired type and shape. For example, the column can be of glass or other suitable inert material. It may be from 1 to 50 meters or more in length and from 2 or less to 10 millimeters or more in diameter. The tube can be of the capillary type if desired, or it may be packed with suitable inert pulverulent support having a particle size of approximately 1 millimeter or less. Suitable packings are known in the art, such as crushed and screened kieselguhr, Carborundum, Celite or other diatomaceous earth, ground firebrick, or a fluorocarbon polymer sold commercially under the tradename Teflon (polytetrafluoroethylene).

A further understanding of the invention will be obtained from a consideration of the following illustrative example wherein a variety of samples were thermally decomposed and an elemental analysis obtained in accordance with the teachings of the invention.

EXAMPLE 1

A sample consisting of 0.1 to 3.0 milligrams of the compounds set forth in Table I were decomposed in the apparatus illustrated at FIGURE 1 with palladium catalyzed cupric oxide as the oxidant. After the combustion was complete helium was admitted to the combustion zone at the rate of 50 to 70 cc./min. and the combustion products were swept from the combustion zone and introduced directly into chromatographic columns respectively containing a fluorocarbon having a coating of carbowax 1500 as the stationary phase and activated carbon. The columns were maintained at a temperature of 100 to 150° C., and the products upon emergence from the column were detected by a thermal conductivity cell. This cell was connected through a Wheatstone bridge circuit to a recording potentiometer from which plots of concentration versus time were obtained in the form of a chromatogram.

From the gas chromatographic measurements thus obtained the following analyses were obtained for the compounds listed in Table I.

TABLE I.—ANALYSES

| Compound | Percent Carbon | | | Percent Hydrogen | | | Percent Hydrogen | | |
|---|---|---|---|---|---|---|---|---|---|
| | Theo. | Meas. | ±S | Theo. | Meas. | ±S | Theo. | Meas. | ±S |
| Histidine hydrochloride monohydrate | 34.44 | 34.9 | 0.19 | 5.27 | 5.56 | 0.26 | 20.1 | 19.6 | 0.21 |
| Glycine | 31.99 | 32.6 | 0.15 | 6.68 | 6.75 | 0.06 | 18.67 | 18.3 | 0.26 |
| Arginine monohydrochloride | 34.20 | 34.1 | 0.58 | 7.13 | 7.24 | 0.17 | 26.55 | 26.1 | 0.14 |
| Glutamic Acid | 40.80 | 40.8 | 0.40 | 6.12 | 6.22 | 0.27 | 9.36 | 9.37 | 0.19 |
| 5-hydroxyindole acetic acid cyclohexylammonium salt | 63.3 | 63.4 | 0.31 | 8.07 | 8.64 | 0.08 | 8.42 | 8.36 | 0.18 |
| Cystine | 29.69 | 30.5 | 0.24 | 5.07 | 5.16 | 0.15 | 11.78 | 11.6 | |
| Homovanillic Acid | 59.40 | 59.6 | 0.34 | 5.49 | 5.39 | 0.08 | 0 | nil | |
| Camphor | 78.8 | 78.6 | | 10.53 | 10.27 | | 0 | nil | |
| Glutamic Acid | 40.80 | 40.8 | 0.42 | 6.12 | 6.17 | 0.23 | | | |

While the procedure described hereinbefore employs oxidation to convert the sample (e.g., liquid or solid) to a form better susceptible to chromatographic analysis, it will be evident that other decomposition procedures, such as hydrogenation and other reduction reactions, may also be employed where appropriate. The specific means for carrying these out need not be set forth in detail.

It is obvious that many embodiments may be made of this inventive concept, and that many modifications may be made in the embodiments hereinbefore described. Therefore, it is to be understood that all descriptive matter herein is to be interpreted merely as illustrative, exemplary, and not in a limiting sense. It is intended that various modifications which might readily suggest themselves to those skilled in the art be covered by the following claims, as far as the prior art permits.

What is claimed is:

1. A method for determining at least the elemental carbon, hydrogen, and nitrogen content of an organic compound by combustion, comprising:

mixing a solid sample of known mass of said compound with a solid metal oxide, as an oxidizing agent, to form a combustion mixture, introducing said combustion mixture into a closed, heated combustion chamber, permitting the combustion mixture in said closed, heated combustion chamber to thermally decompose said oxidizing agent, thereby forming oxygen to produce reaction products including carbon dioxide, water and nitrogen, retaining the reaction products in gaseous state in said closed, heated combustion chamber until combustion of the sample is substantially complete, then sweeping substantially all of the reaction products from said combustion chamber with helium, passing said reaction products and said helium through a gas chromatographic separating column whereby the reaction products are separated respectively into carbon dioxide, water, and nitrogen, and separately determining the quantity of carbon dioxide, water, and nitrogen from which the quantities of elemental nitrogen, hydrogen, and carbon content of the organic compound may be calculated.

2. The method according to claim 1 in which the oxidizing agent is copper oxide.

3. The method according to claim 1 which includes the additional step of permitting the combustion products to expand during retention into a heated, closed expansion tube and then sweeping substantially all of the combustion products from said combustion chamber and said expansion tube with helium.

4. The method according to claim 1 in which the sample is also mixed with a palladium catalyst prior to introduction into the combustion chamber.

References Cited by the Examiner

UNITED STATES PATENTS

| | | | |
|---|---|---|---|
| 3,096,157 | 7/1963 | Brown et al. | 23—232 |
| 3,112,639 | 12/1963 | Maxwell | 73—23.1 |
| 3,112,640 | 12/1963 | Platt | 73—23.1 |
| 3,168,378 | 2/1965 | Maresh et al. | 23—232 |

FOREIGN PATENTS 880,965　10/1961　Great Britain.

OTHER REFERENCES

Baker, et al., Control Engineering, vol. 8 pages 77–81 (1961).

Kuck J. A., Editor, Methods in Microanalysis, Simultaneous Rapid Combustion (volume 1), Gordon and Breach, New York (1964), pages 462–470.

Swann, William B., and Dux, James P., "New Technique for Pyrolyzing Samples for Gas Chromatographic Analysis," Analytical Chemistry, vol. 33, No. 4, pp. 654 and 655, April 1961.

MORRIS O. WOLK, *Primary Examiner.*

H. BIRENBAUM, *Assistant Examiner.*